UNITED STATES PATENT OFFICE.

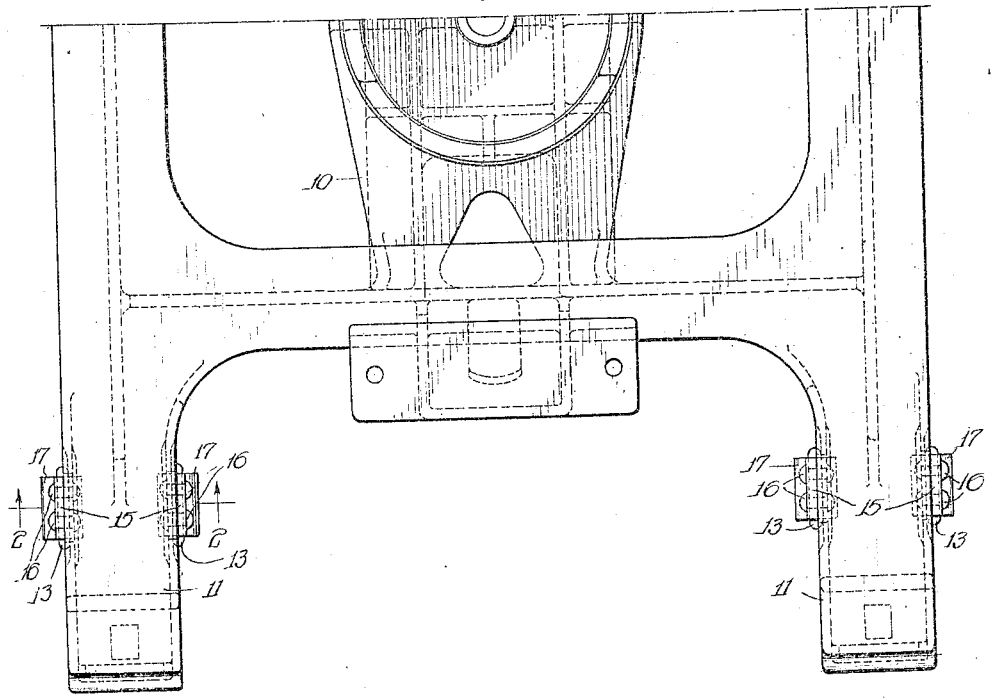
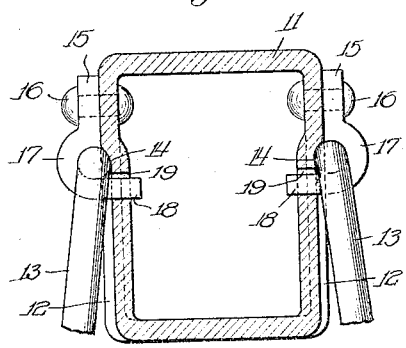
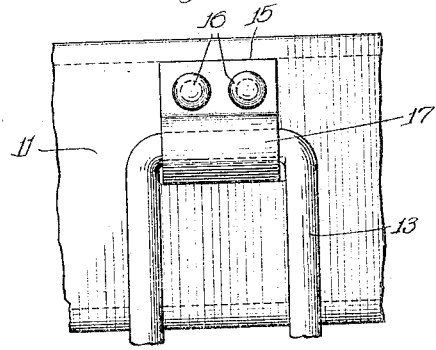

JOHN A. LAMONT, OF CHICAGO, ILLINOIS, ASSIGNOR TO AMERICAN STEEL FOUNDRIES, OF CHICAGO, ILLINOIS, A CORPORATION OF NEW JERSEY.

TRUCK FOR RAILWAY-CARS.

1,377,705.  Specification of Letters Patent.  Patented May 10, 1921.

Application filed December 27, 1920. Serial No. 433,413.

*To all whom it may concern:*

Be it known that I, JOHN A. LAMONT, a citizen of the United States, residing at Chicago, in the county of Cook and State of Illinois, have invented certain new and useful Improvements in Trucks for Railway-Cars, of which the following is a specification.

This invention relates to a truck for railway cars.

It is very desirable to reduce the wheel base of railway car trucks as much as possible to facilitate rounding curves. Such is particularly true in the case of the six-wheel type of truck. In such trucks the problem is a more difficult one. Among other things, the location of truck equipment is one which controls in a measure the length of wheel base. Such equipment must be located, secured in place and given sufficient clearance to function properly. For example, the brakes and their hangers take up a certain amount of longitudinal space and their movements require additional space. Therefore, it is seen how the question of location and securing of brake mechanism is related to the question of the length of wheel base.

One object of the invention is to locate and support brake mechanism in a safe, simple and improved manner whereby the length of the wheel base may be reduced.

Another object is to provide a combination of truck parts which coöperate in an improved manner to reduce the wheel base.

These and other objects are accomplished by means of the arrangement disclosed on the accompanying sheet of drawings, in which—

Figure 1 is a fragmentary plan view of a truck bolster embodying my invention;

Fig. 2 is a detail sectional view taken in the plane of line 2—2 of Fig. 1; and

Fig. 3 is a detail front elevation of the parts shown in Fig. 2.

The various novel features of my invention will be apparent from the following description and drawings and will be particularly pointed out in the appended claims.

Referring to the figures of the drawing, it will be noted that I have disclosed my invention in connection with a railway car truck bolster 10 of the H type, having four legs 11, which, it is understood, transmit the loads to various journals, not shown. As mentioned above, the question of reducing the wheel base to a minimum is a serious one and accordingly wherever any longitudinal space can be saved consistent with the proper functioning of parts an advance in the solution of the problem is made. As is appreciated, a certain amount of longitudinal space is required for the support and free movement of the brake mechanism, and if any longitudinal space can be saved in this connection, the wheel base can be shortened a given amount. In this particular case I have been able to reduce the wheel base by supporting the brake mechanism in a safe, simple and improved manner.

Referring particularly to Fig. 2 of the drawing, it will be noted that the lateral faces of the bolster legs 11 are provided with depressed portions 12 for receiving associated brake hangers 13. The upper portions of the brake hangers are rounded and engage rounded shoulder portions 14 at the upper extremities of the recessed portions 12, such rounded shoulder portions forming partial bearings for the upper portions of the hangers 13. To retain the hangers in place I have provided suitable brackets 15, each of which includes an upper flat portion which is secured to the support or bolster by any suitable means, such as a rivet 16. The brackets also include a hook portion 17, each of which embraces its associated hanger 13 for retaining the hanger in place and forming a suitable bearing for the latter. This hook portion 17 of each of the brackets terminated in a longitudinally extending projection 18, which passes into and through an aperture 19 in the depressed portion of the bolster. In this way each of the brake hangers 13 is safely and securely held in operative position and permits the proper functioning movements of the brakes and their hangers and at the same time permits of a reduced length of the wheel base. It will be noted that the wheel base is reduced four times the dimension of the depressed surface in each case, there being four depressed surfaces in which the hangers are movably mounted in the longitudinal length of the truck.

It is my intention to cover all modifications of the invention falling within the spirit and scope of the following claims.

I claim:

1. In a railway car truck, the combination of a support having a depressed face, a brake hanger mounted to move in said depressed face to reduce the length of the wheel base, and a bracket secured to said support and embracing the hanger for retaining the latter in operative position.

2. In a railway car truck, the combination of a support having a depressed face with an aperture therein, a brake hanger movably mounted in said depressed face for reducing the wheel base, and a hanger supporting bracket secured to said support embracing said hanger and having a portion extending into said aperture.

3. In a railway car truck, the combination of a bolster having a depressed face with an aperture therein, the upper portion of the depressed face terminating in a curved surface, a brake hanger mounted to move in said depressed portion and having a portion coöperating with said curved surface, and a hanger supporting bracket secured to the bolster above the depressed face thereof, embracing said hangers and having a portion extending into said aperture.

4. In a railway car truck, the combination of a bolster having a depressed face with an aperture therein, a brake hanger mounted to move in said depressed portion to reduce the wheel base, and a hanger supporting bracket secured to said bolster, embracing said hanger and having a portion extending into said aperture.

Signed at Chicago, Illinois, this 15th day of December, 1920.

JOHN A. LAMONT.